(12) United States Patent  
Chong et al.

(10) Patent No.: US 9,158,873 B1  
(45) Date of Patent: *Oct. 13, 2015

(54) CIRCUIT DESIGN TECHNIQUE FOR DQS ENABLE/DISABLE CALIBRATION

(71) Applicant: Altera Corporation, San Jose, CA (US)

(72) Inventors: Yan Chong, San Jose, CA (US); Joseph Huang, Morgan Hill, CA (US); Sean Shau-Tu Lu, San Jose, CA (US); Pradeep Nagarajan, Santa Clara, CA (US); Chiakang Sung, Milpitas, CA (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,325

(22) Filed: Jun. 23, 2014

Related U.S. Application Data

(63) Continuation of application No. 13/250,155, filed on Sep. 30, 2011, now Pat. No. 8,787,097.

(51) Int. Cl.
*G11C 7/10* (2006.01)
*G06F 17/50* (2006.01)

(52) U.S. Cl.
CPC .......... *G06F 17/5031* (2013.01); *G11C 7/1066* (2013.01); *G06F 2217/84* (2013.01)

(58) Field of Classification Search
CPC ............... G11C 2207/2254; G11C 29/023; G11C 11/4076; G11C 29/50012; G11C 29/50008; G11C 7/1066; G06F 13/4256; G06F 1/04; G06F 1/14; H03K 5/135; H03K 5/1502

USPC .......... 365/189.02, 189.05, 193, 194, 230.02, 365/233; 375/145, 224, 259, 316; 326/93; 327/237, 241, 243, 245, 258, 269–273

See application file for complete search history.

(56) References Cited

U.S. PATENT DOCUMENTS

| | | | |
|---|---|---|---|
| 6,067,648 A * | 5/2000 | Hunter et al. | 714/718 |
| 6,316,980 B1 * | 11/2001 | Vogt et al. | 327/273 |
| 7,200,769 B1 * | 4/2007 | Chong et al. | 713/503 |
| 7,215,584 B2 | 5/2007 | Butt et al. | |
| 7,443,741 B2 | 10/2008 | Butt et al. | |
| 7,602,859 B2 | 10/2009 | Cheng et al. | |
| 7,688,672 B2 * | 3/2010 | Best et al. | 365/233.1 |
| 7,889,583 B2 * | 2/2011 | Wang | 365/200 |
| 8,121,237 B2 | 2/2012 | Stott et al. | |
| 8,295,118 B2 * | 10/2012 | Best et al. | 365/233.1 |

* cited by examiner

*Primary Examiner* — Vibol Tan
(74) *Attorney, Agent, or Firm* — Ropes & Gray LLP

(57) ABSTRACT

Systems and methods are disclosed for calibrating a Data Strobe (DQS) enable/disable signal and for tracking the timing of the DQS enable/disable signal with respect to changes in voltage and temperature (VT) in order to improve the timing margin of the DQS enable/disable signal in programmable devices using Double Data Rate (DDR) memory. In an exemplary embodiment, the system includes a gating circuit, a sampling circuit, and a delay chain tracking circuit. The gating circuit receives a DQS enable signal and a input DQS signal, calibrates the DQS enable signal based on an amount of delay, and outputs the calibrated DQS signal. The sampling circuit provides the amount of delay to the gating circuit based on a sampling clock. The delay chain tracking circuit maintains the timing of the calibrated DQS enable signal over a plurality of clock cycles based on the sampling clock and a leveling clock.

19 Claims, 6 Drawing Sheets

CIRCUIT DESIGN TECHNIQUE FOR DQS ENABLE/DISABLE CALIBRATION

CROSS-REFERENCE TO RELATED APPLICATIONS

This application is a continuation of U.S. patent application Ser. No. 13/250,155, filed Sep. 30, 2011 (currently pending), which is hereby incorporated by reference herein in its entirety.

BACKGROUND OF THE DISCLOSURE

This disclosure relates to systems and methods for calibrating a Data Strobe (DQS) enable/disable signal and for tracking the timing of the DQS enable/disable signal with respect to changes in voltage and temperature (VT) in order to improve the timing margin of the DQS enable/disable signal in programmable devices using Double Data Rate (DDR) memory.

DDR Synchronous Dynamic Random Access Memory (DDR SDRAM) is a type of memory that operates at twice the data transfer rate of Synchronous Dynamic RAM (SDRAM). In SDRAM, data (DQ) input/output is synchronized with the rising edges of a clock signal. In DDR SDRAM, data input/output is synchronized with both the rising and falling edges of the clock. Specifically, DDR SDRAM utilizes a DQS signal, which has the same period as the clock, to synchronize the data input/output.

DQS is a bi-directional strobe signal that functions as the operating clock for DQ during both read and write operations. DQS is a tri-state logic signal, i.e., DQS can have one of three signal values—high-impedance, logic low, or logic high. DQS is generally in a high-impedance state when it is not required. When a command is received to perform a read operation, DQS switches from the high-impedance state to a logic low signal value approximately one clock cycle prior to data output. The duration during which DQS has a logic low signal level is referred to as a preamble. A DQS enable signal may be generated such that the DQS enable signal becomes high logic in the middle of the DQS preamble period. Similarly, once the read operation is complete, after approximately half a clock cycle of the last falling edge of DQS, DQS reverts back to a high-impedance state. The duration of time after the read operation is complete and before DQS reverts back to a high-impedance state is referred to as a postamble. A DQS disable signal may be generated at some time during the postamble period to prevent DQS from being utilized when it is in the high-impedance state.

As the performance requirements of DDR SDRAM increase, e.g., as DDR SDRAM is required to support higher data rates, the timing requirements of the DQS enable/disable signal become more stringent because the DQS frequency increases and the time window during which the DQS enable/disable signal may be generated becomes smaller. In some instances, the timing margin of the DQS enable/disable signal shrinks faster than the timing margin of the read/write operations. This makes it challenging to generate the DQS enable/disable signal accurately.

DQS and DQ are generally source synchronous signals, i.e., DQS and DQ are both generated based on the same clock signal and typically have the same routing path. This implies that if there is any jitter in the clock signal then both DQS and DQ are affected equally. Therefore, the timing of DQS relative to DQ does not change significantly. In contrast, the DQS enable/disable signal is not a source synchronous signal, i.e., it is not generated based on the same clock signal as DQS and DQ. Therefore, the DQS enable/disable signal is susceptible to jitter relative to the DQS and DQ signals. The DQS enable/disable signal is also susceptible to VT variations. These aspects of the DQS enable/disable signal add to the challenge of generating it accurately.

SUMMARY OF THE DISCLOSURE

To address the above and other shortcomings within the art, the present disclosure provides methods and systems for calibrating a DQS enable/disable signal and for tracking the timing of the DQS enable/disable signal with respect to changes in VT in order to improve the timing margin of the DQS enable/disable signal in programmable devices using DDR memory.

Methods and systems are provided for calibrating the timing of a DQS enable/disable signal. In an embodiment, the system includes a gating circuit, a sampling circuit, and a delay chain tracking circuit. The gating circuit receives a DQS enable/disable signal and an input DQS signal. The gating circuit may be operative to calibrate the DQS enable/disable signal based on an amount of delay on a DQS enable/disable signal path. The gating circuit further may be operative to output a gated DQS signal. The sampling circuit may be operative to sample the input DQS signal using a sampling clock and provide information on how to adjust the delay on the DQS enable/disable path based on the sampling results. The delay chain tracking circuit may be coupled to the gating circuit and the sampling circuit. The delay chain tracking circuit may be operative to provide information regarding the number of delay steps that are equivalent to one leveling phase based on the sampling clock and a leveling clock. In an embodiment, the delay chain tracking circuit maintains the timing of the calibrated DQS enable signal over a plurality of clock cycles based on the sampling clock and a leveling clock.

In some embodiments, the gating circuit may calibrate the timing of the DQS enable/disable signal such that a falling edge of the calibrated DQS enable/disable signal is aligned with a rising edge of the input DQS signal. In some embodiments, the delay chain tracking circuit may maintain the number of delay steps by which a delay chain may delay its input signal when the leveling phase is increased or decreased by tracking the delay chain variation through voltage and temperature changes.

In some embodiments, the delay chain tracking circuit includes a first tracking circuit operative to generate an align signal that indicates that a phase of the leveling clock needs to be increased and the amount of delay set to zero and a second tracking circuit operative to generate a valid signal and generate a delay control signal. When the phase of the leveling clock needs to be decreased, the amount by which the phase of the leveling clock needs to be decreased may be provided by the generated delay control signal.

In some embodiments, the first tracking circuit includes a delay chain operative to generate an input signal for a phase detector, where the phase detector is operative to process the sampling clock and the leveling clock and output an indicator signal. The first tracking circuit may include a plurality of registers for checking a phase of the indicator signal over the plurality of clock cycles, where an output of each of the plurality of registers is used to generate the align signal.

In some embodiments, the second tracking circuit includes a phase detector operative to process the leveling clock and output an indicator signal. The second tracking circuit may include a plurality of registers for checking a phase of the indicator signal over the plurality of clock cycles, where an output of each of the plurality of registers is used to generate the valid signal.

In some embodiments, the sampling circuit includes a delay chain operative to receive a delay control signal from an assistant logic circuit. The delay chain may generate a sampling clock responsive to the delay control signal such that the delay control signal adjusts a phase of the sampling clock. The sampling circuit may include a phase detector operative to sample the input DQS signal using the sampling clock and output an indicator signal. The sampling circuit may include a noise filter operative to filter high frequency noise from the indicator signal and transmit the filtered signal to the assistant logic circuit. In some embodiments, the noise filter is configurable to be disabled during a calibration phase of the sampling circuit.

In some embodiments, the system includes a leveling multiplexer circuit coupled to the gating circuit, the sampling circuit, and the delay chain tracking circuit, such that the leveling multiplexer circuit is operative to provide three clock signals. In some embodiments, each clock signal has a common frequency and a different phase.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION OF THE INVENTION

To provide an overall understanding of the invention, certain illustrative embodiments will now be described. However, it will be understood by one of ordinary skill in the art that the systems and methods described herein may be adapted and modified as is appropriate for the application being addresses and that the systems and methods described herein may be employed in other suitable applications, and that such other additions and modifications will not depart from the scope hereof.

Figure 1:
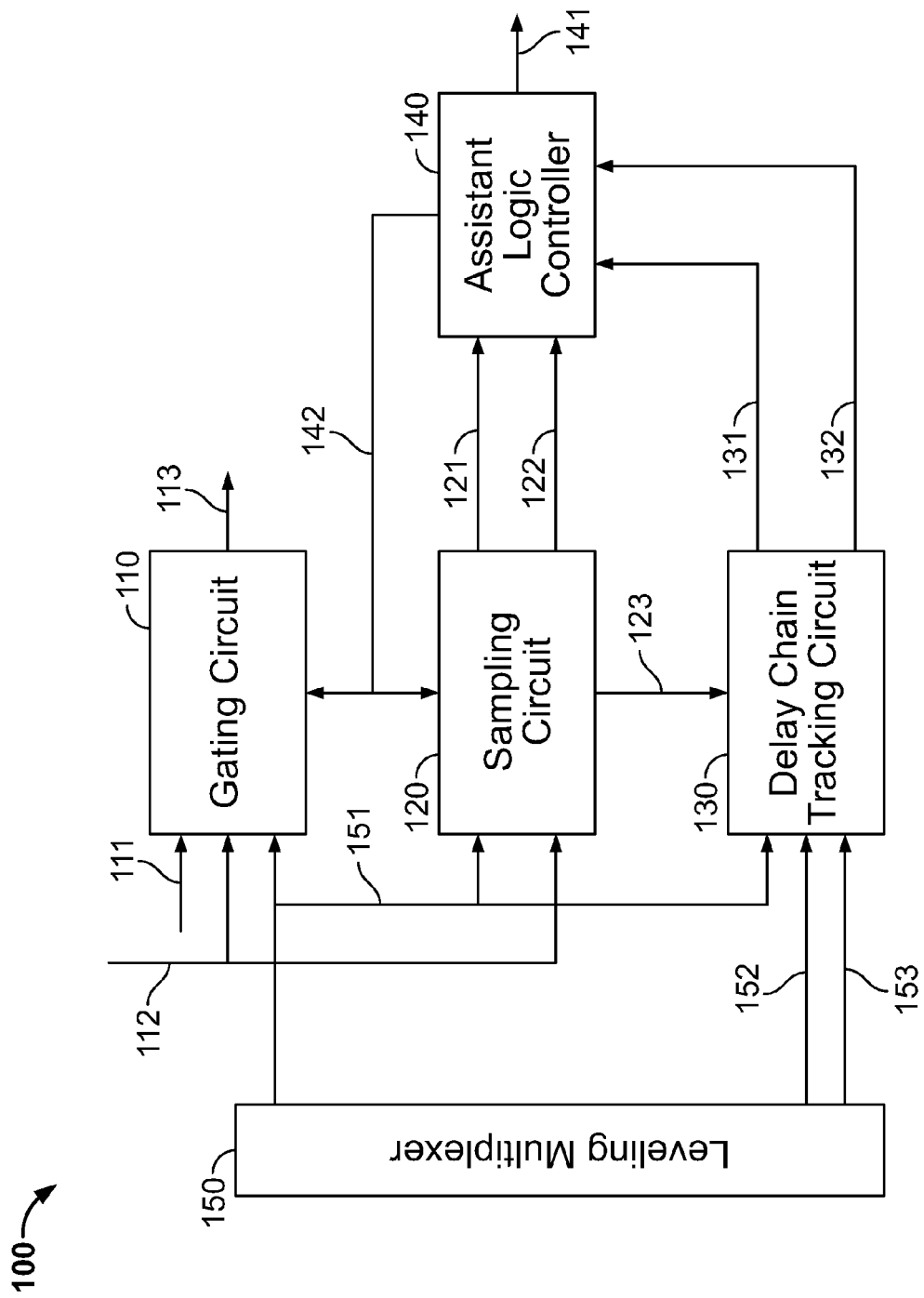
FIG. 1 is a simplified block diagram of circuit 100 for calibrating a DQS enable/disable signal and for tracking the timing of the DQS enable/disable signal with respect to changes in VT, according to an illustrative embodiment.

FIG. 1 is a simplified block diagram of circuit 100 for calibrating a DQS enable/disable signal and for tracking the timing of the DQS enable/disable signal with respect to changes in VT, according to an illustrative embodiment. Circuit 100 can be an integrated circuit, an application-specific integrated circuit (ASIC), a programmable logic device (PLD), a field programmable gate array (FPGA), or a chip. It should also be understood that circuit 100 may be a combination of devices, such as an FPGA and an ASIC, and/or may include additional, stand-alone circuit components. In an embodiment, circuit 100 includes gating circuit 110, sampling circuit 120, delay chain tracking circuit 130, assistant logic controller 140, and leveling multiplexer 150. A brief description of the overall functioning of circuit 100 is provided below. These and other components of circuit 100 are described in greater detail later with respect to FIG. 2.

In an embodiment, leveling multiplexer 150 is operable to receive eight clock signals, each of which has the same frequency as a master clock signal but all of which have different phases with respect to each other. In an embodiment, the eight clock signals have phases of 0 degrees, 45 degrees, 90 degrees, 135 degrees, 180 degrees, 225 degrees, 270 degrees, and 315 degrees, respectively. Because each of the eight clock signals is derived from a master clock signal, the frequency and phase of each of the eight clock signals is invariant with respect to voltage and temperature (VT). Although the phase difference between clock signals is described as increasing by increments of 45 degrees, this is merely illustrative and other values may instead be chosen. For example, the phase difference between the clock signals may be 30 degrees, although this may come at the cost of increased complexity. In this case leveling multiplexer 150 would receive 12 clock signals with respective phases 0 degrees, 30 degrees, 60 degrees, 90 degrees, 120 degrees, 150 degrees, 180 degrees, 210 degrees, 240 degrees, 270 degrees, 300 degrees, and 330 degrees.

When it receives eight clock signals, with a phase difference of 45 degrees between clock signals, leveling multiplexer 150 is operable to select and output three of the eight clock signals it receives. In an embodiment, leveling multiplexer 150 outputs three clock signals LVL_CLK 151, PLVL_CLK 152, and NLVL_CLK 153, each of which has a common frequency but a different phase. In an embodiment, PLVL_CLK 152 has a phase that is 45 degrees less than the phase of LVL_CLK 151, while NLVL_CLK 153 has a phase that is 45 degrees greater than the phase of LVL_CLK 151. The phase difference of 45 degrees each between LVL_CLK 151 and PLVL_CLK 152, and LVL_CLK 151 and NLVL_CLK 153, is merely illustrative and in other embodiments any phase difference between 0 and 360 degrees may be used. For example, if leveling multiplexer 150 receives 12 clock signals, as described above, then PLVL_CLK 152 may have a phase that is 30 degrees less than the phase of LVL_CLK 151, while NLVL_CLK 153 may have a phase that is 30 degrees greater than the phase of LVL_CLK 151.

In an embodiment, leveling multiplexer 150 may include three separate multiplexers (not shown). Each of these three multiplexers may be operable to select clock signals LVL_CLK 151, PLVL_CLK 152, or NLVL_CLK 153 from the eight clock signals input to leveling multiplexer 150. In an embodiment, leveling multiplexer 150 is connected to assistant logic controller 140 and receives one or more control signals (not shown) from assistant logic controller 140. Leveling multiplexer 150 is additionally connected to gating circuit 110, sampling circuit 120, and delay chain tracking circuit 130.

In an embodiment, gating circuit 110 receives input signals: DQS_IN 112, DQS_EN 111, LVL_CLK 151, and delay chain control signal 142, and outputs signal DQS_OUT 113. Gating circuit 110 is connected to leveling multiplexer 150 to receive signal LVL_CLK 151. Gating circuit 110 is connected to assistant logic controller 140 to receive delay chain control signal 142.

Gating circuit 110 includes logic circuitry to enable/disable the DQS signal DQS_IN 112 as well as logic circuitry to control the timing of the DQS enable/disable signal DQS_EN 111. The timing of DQS enable/disable signal DQS_EN 111 is controlled such that the falling edge of DQS_EN 111 is aligned with the rising edge of DQS_IN 112. Gating circuit 110 outputs signal DQS_OUT 113 which represents a DQS signal that has been gated by the calibrated DQS enable/disable signal DQS_EN 111.

In an embodiment, sampling circuit 120 receives input signals: DQS_IN 112, LVL_CLK 151, and delay chain control signal 142. Sampling circuit 120 is connected to assistant logic controller 140 and outputs signals UPNDWNO 121 and UPDWNENO 122 to assistant logic controller 140. Sampling circuit 120 is connected to delay chain tracking circuit 130 and outputs signal SMPL_CLK 123 to delay chain tracking circuit 130. Sampling circuit 120 is also connected to leveling multiplexer 150 to receive signal LVL_CLK 151 from multiplexer 150.

Sampling circuit 120 is operable to assist gating circuit 110 in controlling the timing of the DQS enable/disable signal DQS_EN 111. In an embodiment, sampling circuit 120 is operable to initially calibrate gating circuit 110 such that the timing of DQS enable/disable signal DQS_EN 111 is accurate. Sampling circuit 120 is additionally operable to track variations in DQS signal DQS_IN 112 and adjust the timing of DQS enable/disable signal DQS_EN 111 accordingly.

In an embodiment, delay chain tracking circuit 130 receives input signals: LVL_CLK 151, PLVL_CLK 152, NLVL_CLK 153, and SMPL_CLK 123, and outputs signals ALIGN 131 and VALID 132 to assistant logic controller 140. Delay chain tracking circuit 130 is connected to leveling multiplexer 150 to receive signals LVL_CLK 151, PLVL_CLK 152, and NLVL_CLK 153. Delay chain tracking circuit 130 is connected to assistant logic controller 140 to output signals ALIGN 131 and VALID 132. Delay chain tracking circuit 130 is also connected to sampling circuit 120 to receive SMPL_CLK 123.

In an embodiment, delay chain tracking circuit 130 is operable to track the operation of some components of gating circuit 110 after sampling circuit 120 has properly calibrated those components of gating circuit 110. Specifically, delay chain tracking circuit 130 is designed to track an amount of delay introduced by components (e.g., a delay chain) of gating circuit 110 with respect to the phase of clock signal LVL_CLK 151 selected by leveling multiplexer 150 such that when the amount of delay provided by those components of gating circuit 110 approaches 45 degrees, the phase of the clock signal LVL_CLK 151 selected by leveling multiplexer 150 is incremented by 45 degrees and the delay provided by those components of gating circuit 110 is simultaneously set to 0. On the other hand, when the delay provided by those components of gating circuit 110 approaches 0 and needs to be further reduced, the phase of the clock signal LVL_CLK 151 selected by leveling multiplexer 150 is decremented by 45 degrees and the delay provided by those components of gating circuit 110 is simultaneously set to a value provided by delay chain tracking circuit 130.

In an embodiment, delay chain tracking circuit 130 is operable to track the variations in the phase of the clock signal LVL_CLK 151 selected by leveling multiplexer 150 and signal SMPL_CLK 123 generated by sampling circuit 120. Such phase tracking assists gating circuit 110 in adjusting the timing of DQS enable/disable signal DQS_EN 111 for overcoming variations in the timing of intermediate control signals due to voltage and temperature.

In an embodiment, assistant logic controller 140 receives input signals UPNDWNO 121 and UPDWNENO 122 from sampling circuit 120 and signals ALIGN 131 and VALID 132 from delay chain tracking circuit 130. Assistant logic controller 140 outputs delay chain control signal 142 to gating circuit 110 and sampling circuit 120. In an embodiment, assistant logic controller 140 may also output other control signals 141 to any other component (not shown) on or off of circuit 100.

In an embodiment, leveling multiplexer 150, gating circuit 110, sampling circuit 120, delay chain tracking circuit 130 and assistant logic controller 140 may all be used in combination for calibrating a DQS enable/disable signal and for tracking the timing of the DQS enable/disable signal with respect to changes in voltage and temperature.

Figure 2:
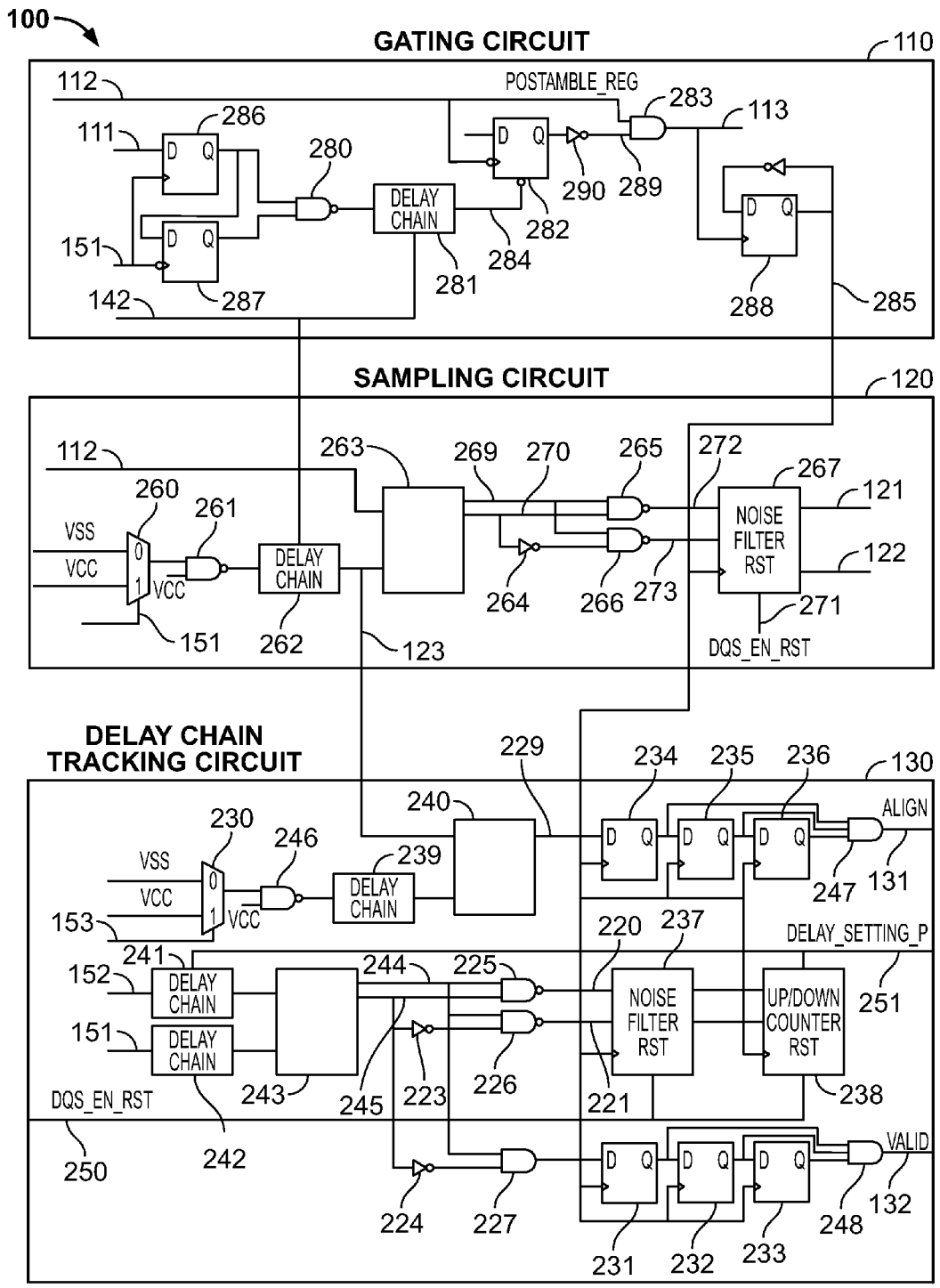
FIG. 2 is a more detailed, but still simplified block diagram of a representative portion of circuit 100.

FIG. 2 is a more detailed, but still simplified block diagram of a representative portion of circuit 100. In an embodiment, circuit 100 includes gating circuit 110, sampling circuit 120, delay chain tracking circuit 130, assistant logic controller 140 (not shown), and leveling multiplexer 150 (not shown). Gating circuit 110, sampling circuit 120, and delay chain tracking circuit 130 are each described in detail below.

Gating circuit 110 includes NAND gate 280, delay chain 281, registers 282, 286, 287, and 288, inverter 290, and AND gate 283. Gating circuit 110 receives inputs DQS_IN 112 and DQS_EN 111 and outputs signal DQS_OUT 113. Registers 286 and 287 are connected to each other as well as to NAND gate 280. NAND gate 280 is connected to delay chain 281. Register 282, also referred to as a postamble register, is connected to delay chain 281 and inverter 290. Inverter 290 is connected to AND gate 283. AND gate 283 is operable to output signal DQS_OUT 113. Gating circuit 110 is also connected to sampling circuit 120 and delay chain tracking circuit 130. In an embodiment, gating circuit 110 provides circuit clock signal 285 to sampling circuit 120 and delay chain tracking circuit 130.

Register 286 is operable to receive first and second input signals DQS_EN 111 and LVL_CLK 151. Register 287 is operable to receive a first input signal LVL_CLK 151. Register 287 is connected to register 286 such that the output of register 286 is a second input signal to register 287. Registers 286 and 287 are connected to NAND gate 280 such that the outputs of each register 286 and 287 are input signals to NAND gate 280. NAND gate 280 and registers 286 and 287, together, represent a half-cycle conversion circuit. The half-cycle conversion circuit delays the rising edge of input signal DQS_EN by half a clock cycle and inverts the signal. The output of the half-cycle conversion circuit is input to delay chain 281.

Delay chain 281 is a variable delay chain that is configurable to delay an input signal by a variable amount. Generally, delaying a signal refers to increasing the phase of the signal. As used herein, the phrase adjusting the delay of a signal is used interchangeably with the phrase adjusting the phase of a signal. In an embodiment, delay chain 281 may be configured to delay an input signal by an amount that can be selected precisely from a range of delays. For example, in an embodiment, delay chain 281 may be configurable to provide delay amounts over a range of 0 to 45 degrees. In contrast, since the phases of any two consecutive clock signals input to leveling multiplexer 150 differ from each other by 45 degrees, leveling multiplexer 150 may be limited to selecting a clock signal for output whose phase differs from the phase of any previous clock signal leveling multiplexer 150 selected for output by at least 45 degrees. Therefore, delay chain 281 provides delay amounts of finer resolution than the clock signals that can be selected by leveling multiplexer 150.

In an embodiment, delay chain 281 is an inverter delay chain. An inverter delay chain is a type of delay chain that utilizes inverter circuits for delaying the signal input to the delay chain. However, other types of delay chains may also be used. For example, differential delay elements may be used in the delay chain or thyristors may be used as delay elements in the delay chain. In an embodiment, an inverter delay chain may be preferable because of its simplicity and low power consumption. However, because inverter delay chains are sensitive to variations in voltage and temperature, delay tracking may be required in order to minimize any variation in delay. In an embodiment, such delay tracking is provided by sampling circuit 120.

In an embodiment, delay chain 281 is operable to delay the output of NAND gate 280 by an amount of delay between 0 and 45 degrees. The precise amount by which delay chain 281 delays its input signal (the output of NAND gate 280) is governed by delay chain control signal 142 which is received by gating circuit 110 from assistant logic controller 140 of FIG. 1. The amount by which delay chain 281 delays its input signal is determined by sampling circuit 120 as explained in more detail later. In an embodiment, delay chain 281 may be operable to delay its input signal only by integer multiples of a duration that is defined to be a delay step. In an embodiment, a delay step may be 12.5, 25, or 37.5 picoseconds. The signal output by delay chain 281, NDQSEN 284, is input to postamble register 282. NDQSEN 284 is a delayed and inverted version of signal DQS_EN 111 and a rising edge of DQS_EN 111 corresponds to a falling edge of NDQSEN 284.

Postamble register 282 is operable to receive input signals NDQSEN 284, DQS_IN 112, and VCC. Postamble register 282 is clocked by DQS_IN 112. Postamble register 282 is connected to inverter 290, which receives as input the output of postamble register 282. Inverter 290 inverts the output of postamble register 282 and outputs signal DQS_ENO 289 such that DQS_ENO 289 is an inverted version of the output of postamble register 282.

When NDQSEN 284, which is input to postamble register 282, is logic low, postamble register 282 is cleared and NDQSEN 284 is immediately passed through to the output of postamble register 282, i.e., the output of postamble register 282 is also logic low. The output of postamble register 282 is inverted by inverter 290 to generate DQS_ENO 289, which will be logic high. DQS_ENO 289 is input to AND gate 283 which also receives DQS_IN 112 as a second input. AND gate 283 is operable to perform a logical AND operation on input signals DQS_ENO 289 and DQS_IN 112 to output DQS_OUT 113. Therefore, when DQS_ENO 289 is logic high, the output of AND gate 283 will be DQS_IN 112, i.e., DQS_OUT 113 will resemble DQS_IN 112. Therefore, based on the above description, DQS_OUT 113 is a the desired DQS signal when DQS_EN 111 is enabled (is logic high) since NDQSEN 284 is a delayed and inverted version of signal DQS_EN 111 and a rising edge of DQS_EN 111 corresponds to a falling edge of NDQSEN 284.

When NDQSEN 284 is logic high, postamble register 282 waits for the falling edge of DQS_IN 112. As long as postamble register 282 does not receive the falling edge of DQS_IN 112, postamble register 282 continues to output a low signal to inverter 290. The output of inverter 290, DQS_ENO 289, will therefore be logic high and the output of AND gate 283, DQS_OUT 113, will resemble DQS_IN 112. However, as soon as postamble register 282 receives the falling edge of DQS_IN 112, postamble register 282 outputs a logic high signal to inverter 290. The output of inverter 290, DQS_ENO 289, will therefore be logic low. DQS_ENO 289 is then input to AND gate 283 which performs a logical AND operation on input signals DQS_ENO 289 and DQS_IN 112. Performing a logical AND operation on two signals, one of which is logic low, results in an output which is also logic low. Therefore, the output of AND gate 283, DQS_OUT 113, will be logic low, i.e., disabled. Based on the above description, DQS_OUT 113 is disabled at the falling edge of DQS_IN 112 when DQS_EN 111 is disabled (is logic low) since NDQSEN 284 is a delayed and inverted version of signal DQS_EN 111 and the rising edge of DQS_EN 111 corresponds to a falling edge of NDQSEN 284. Therefore, when DQS_EN 111 is disabled, the DQS signal is disabled after the last falling edge of DQS_IN 112, as desired.

Sampling circuit 120 includes multiplexer 260, NAND gates 261, 265, and 266, delay chain 262, phase detector 263, inverter 264, and noise filter 267. Sampling circuit 120 receives inputs DQS_IN 112, LVL_CLK 151, and delay chain control signal 142, and outputs signals SMPL_CLK 123, UPNDWNO 121, and UPDWNENO 122.

Multiplexer 260 is connected to NAND gate 261. Multiplexer 260 receives input signals VSS and VCC and is operable to select one of VSS or VCC based on signal LVL_CLK 151, which functions as a control signal for multiplexer 260. Multiplexer 260 outputs the selected signal as a first input to NAND gate 261. NAND gate 261, which receives a second input signal VCC, is connected to delay chain 262 at its output. Delay chain 262, which receives delay control signal 142 and the output of NAND gate 261 as inputs, is connected to phase detector 263 at its output. Phase detector 263, which is operable to output signals 269 and 270, is connected to inverter 264 and NAND gates 265 and 266. NAND gates 265 and 266 are each connected to noise filter 267. Noise filter 267 receives input signal DQS_EN_RST 271 and is operable to output signals UPNDWNO 121 and UPDWNENO 122.

Sampling circuit 120 calibrates the setting of delay chain 281 in order to find the optimum timing for DQS_EN 111. In particular, sampling circuit 120 determines the amount by which signal DQS_EN 111 should be delayed by delay chain 281. The timing of the rising edge of DQS_EN 111 is directly related to the timing of the rising edge of DQS_ENO 289. Ideally, the rising edge of DQS_ENO 289 should be positioned in the middle of the DQS preamble period. Because the rising edge of DQS_ENO 289 is separated from the rising edge of DQS_EN 111 by an amount of delay introduced by delay chain 281 based on delay chain control signal 142, knowing where the rising edge of DQS_ENO 289 should be positioned allows sampling circuit 120 to determine the amount by which delay chain 281 should delay its input signal. In an embodiment, sampling circuit 120 determines delay chain control signal 142 based on the above criterion, as explained below.

Sampling circuit 120 receives LVL_CLK 151 from leveling multiplexer 150 of FIG. 1 and generates sampling clock SMPL_CLK 123 based on this input. SMPL_CLK 123 is generated in a manner that mimics the circuit path followed by DQS_EN 111 in gating circuit 110. In an embodiment, the circuit path of gating circuit 110 may be defined by components register 286, NAND gate 280, and delay chain 281. The output of delay chain 281 is referred to as NDQSEN 289. Consequently, SMPL_CLK 123 may be generated by sampling circuit 120 to resemble NDQSEN 284 at the output of delay chain 281. In particular, some components of sampling circuit 120 that make up a circuit path may be substantially similar to some components of gating circuit 110 that make up the circuit path followed by DQS_EN 111. For example, in an embodiment, NAND gate 280 and delay chain 281 in gating circuit 110 correspond respectively to NAND gate 261 and delay chain 262 in sampling circuit 120. Therefore, the rising edge of SMPL_CLK 123 will be aligned with the rising edge of NDQSEN 284. For this reason, sampling circuit 120 can operate on SMPL_CLK 123 instead of DQS_EN 111 in order to calibrate delay chain 281 to find the optimum timing for DQS_EN 111.

Multiplexer 260 is operable to select one of input signals VCC or VSS based on LVL_CLK 151. When LVL_CLK 151 is logic high, multiplexer 260 selects VCC and when LVL_CLK 151 is logic low, multiplexer 260 selects VSS. The output of multiplexer 260 is transmitted to NAND gate 261 as a first input. NAND gate 261 receives signal VCC as its second input. NAND gate 261 performs a logical NAND operation on its two input signals and transmits the resulting signal to delay chain 262. Delay chain 262 delays this resulting signal by an amount determined according to delay chain control signal 142. The output of delay chain 262 is SMPL_CLK 123.

SMPL_CLK 123 and DQS_IN 112 are input to phase detector 263 which outputs signals SMPLO1 270 and SMPLO2 269. For convenience, output signals SMPLO2 269 and SMPLO1 270 will be denoted as the tuple SMPLO[2:1]. Each of output signals SMPLO1 270 and SMPLO2 269 is a signal with binary values of either 0 or 1. Therefore, the tuple SMPLO[2:1] may assume values from the set of values [0,0], [0,1], [1,0], or [1,1].

Phase detector 263 is operable to compare the phase of input signals SMPL_CLK 123 and DQS_IN 112. Output signals SMPLO1 270 and SMPLO2 269 indicate the result of this phase comparison. If the rising edge of SMPL_CLK 123 is aligned with the rising edge of DQS_IN 112, then SMPL_CLK 123 and DQS_IN 112 are aligned with each other and there is no phase difference between the two signals. When SMPL_CLK 123 and DQS_IN 112 are aligned, SMPLO[2:1]=[1,0]. If the rising edge of SMPL_CLK 123 is ahead of the rising edge of DQS_IN 112, then SMPL_CLK 123 and DQS_IN 112 are not aligned with each other and the phase of SMPL_CLK 123 may be increased in order to align it with DQS_IN 112. When the rising edge of SMPL_CLK 123 is ahead of the rising edge of DQS_IN 112, SMPLO[2:1]=[1,1]. If the rising edge of SMPL_CLK 123 is behind the rising edge of DQS_IN 112, then SMPL_CLK 123 and DQS_IN 112 are not aligned with each other and the phase of SMPL_CLK 123 may be decreased in order to align it with DQS_IN 112. When the rising edge of SMPL_CLK 123 is behind the rising edge of DQS_IN 112, SMPLO[2:1]=[0,0]. Signals SMPLO2 269 and SMPLO1 270 indicate whether delay chain 281 should increase the amount by which it delays its input signal or decrease the amount by which it delays its input signal.

Instead of comparing the phase of DQS_EN 111 to the phase of DQS_IN 112 to determine the timing for DQS_EN 111, sampling circuit is able to compare the phase of SMPL_CLK 123 to the phase of DQS_IN 112, as described above, because the rising edge of SMPL_CLK 123 is aligned with the rising edge of NDQSEN 284. The timing of the rising edge of NDQSEN 284 is directly related to the timing of the rising edge of DQS_EN 111. For this reason, sampling circuit 120 can operate on SMPL_CLK 123 instead of DQS_EN 111 in order to calibrate delay chain 281 to find the optimum timing for DQS_EN 111.

The process of comparing the phases of signals SMPL_CLK 123 and DQS_IN 112 is described above in terms of a comparison of the rising edges of each of the signals SMPL_CLK 123 and DQS_IN 112, however in another embodiment, a comparison of the falling edges of each of the signals SMPL_CLK 123 and DQS_IN 112 may instead be made.

In an embodiment, phase detector 263 may be a differential phase detector. Phase detector 263, which is operable to provide accurate sampling results, is described in greater detail later with respect to FIG. 4.

In some embodiments, signals SMPLO2 269 and SMPLO1 270 may be distorted by high frequency noise. For example, one or both of signals SMPLO2 269 and SMPLO1 270 may alternate between the values 0 and 1 rapidly. Therefore, in some embodiments, it may be desirable to filter out high frequency noise from signals SMPLO2 269 and SMPLO1 270 in order to obtain a reliable indication of the phase difference between signals SMPL_CLK 123 and DQS_IN 112. Filtering of high frequency noise from signals SMPLO2 269 and SMPLO1 270 is described in detail below.

NAND gate 265 receives signals SMPLO2 269 and SMPLO1 270 from phase detector 263 and performs a logical NAND operation to generate signal UPNDWN 272. NAND gate 266 receives signal SMPLO2 269 from phase detector 263 and an inverted version of signal SMPLO1 270 from inverter 264 and performs a logical NAND operation to generate signal UPDWNEN 273. Signals UPNDWN 272 and UPDWNEN 273 are transmitted by NAND gates 265 and 266 respectively to noise filter 267. Noise filter 267 is operable to filter out high frequency noise from signals UPNDWN 272 and UPDWNEN 273. Signals UPNDWNO 121 and UPDWNENO 122, output by noise filter 267, correspond respectively to signals UPNDWN 272 and UPDWNEN 273 from which high frequency noise has been removed. Signals UPNDWNO 121 and UPDWNENO 122 are transmitted to assistant logic controller 140 of FIG. 1. Noise filter 267 is described in greater detail later with respect to FIG. 5. TABLE 1 depicts the values of signals UPNDWNO 121 and UPDWNENO 122 transmitted to assistant logic controller 140 of FIG. 1 for the possible values of the tuple SMPLO[2:1]. When SMPLO[2:1]=[1,0], signals SMPL_CLK 123 and DQS_IN 112 are aligned, thus delay chain 281 does not need to adjust the amount by which it delays the signal input into it. This is reflected in TABLE 1, i.e., when SMPLO[2:1]=[1,0], the value of signal UPNDWNO 121 is a "don't care" while the value of signal UPDWNENO 122 is 0. Whenever the value of signal UPDWNENO 122 changes to 1, it implies that some form of delay correction to signal SMPL_CLK 123 and thus, to signal DQS_EN 111 may be applied, i.e., the delay of signal DQS_EN 111 either needs to be increased or decreased.

TABLE 1

| Phase of SMPL_CLK 123 relative to phase of DQS_IN 112 is | SMPLO[2:1] | UPDWNEN 273 | UPNDWN 272 | UPDWNENO 122 | UPNDWNO 121 |
|---|---|---|---|---|---|
| AHEAD | [0,0] | 1 | 1 | 1 | 1 |
| ALIGNED | [1,0] | 0 | 1 | 0 | X |
| BEHIND | [1,1] | 1 | 0 | 1 | 0 |

Filtering out high frequency noise using noise filter 267 may introduce a delay of one or more clock cycles in the transmission of signals UPNDWNO 121 and UPDWNENO 122 to assistant logic controller 140 of FIG. 1. This delay may also delay the instructions, e.g., delay control signal 142, to delay chain 281 to increase or decrease the amount of delay. The delaying of instructions to delay chain 281 may be undesirable in some instances, e.g., during the initial calibration of delay chain 281. Therefore, in some embodiments, it is possible to bypass noise filter 267 by setting UPNDWNO 121 and UPDWNENO 122 respectively to SMPLO2 269 and SMPLO1 270.

Delay chain tracking circuit 130 includes multiplexer 230, delay chains 239, 241, and 242, phase detectors 240 and 243, registers 231, 232, 233, 234, 235, and 236, noise filter 237, counter 238, NAND gates 225, 226, and 246, inverters 223 and 224, and AND gates 227, 247, and 248. In an embodiment, delay chain tracking circuit 130 receives inputs LVL_CLK 151, PLVL_CLK 152, NLVL_CLK 153, and SMPL_CLK 123, and delay control signal 251, and outputs signals ALIGN 131, VALID 132, and delay control signal 251.

Multiplexer 230 is connected to leveling multiplexer 150 and NAND gate 246. Delay chain 239 is connected to NAND gate 246 and phase detector 240. Phase detector 240 is connected to registers 234, 235, and 236. Registers 234, 235, and 236 are connected to AND gate 247 which is operable to output signal ALIGN 132.

Delay chains 241 and 242 receive input signals NLVL_CLK 153 and LVL_CLK 151 respectively. Delay chain 241 additionally receives delay control signal 251. Delay chains 241 and 242 are connected to phase detector 243 which is operable to output signals 244 and 245. Phase detector 243 is connected to noise filter 237 and registers 231, 232, and 233. Registers 231, 232, and 233 are connected to AND gate 248 which is operable to output signal VALID 132. Noise filter 237 is connected to counter 238. Counter 238 receives delay control signal 251 and signal DQS_EN_RST 250 as inputs.

As discussed earlier, delay chain 281 is susceptible to changes in temperature and voltage. In contrast, the phases of the clock signals selected by leveling multiplexer 150 do not vary with changes in temperature or voltage. Accordingly, it may be preferable to minimize the use of delay chain 281 and rely on the using the clock signal LVL_CLK 151 selected by leveling multiplexer 150 as often as possible. However, because the phase of clock signal LVL_CLK 151 selected by leveling multiplexer 150 can only be varied in increments or decrements of a fixed value, for example, by 45 degree increments or decrements, delay chain 281 is essential for adjusting delays in finer increments. Therefore, delay chain 281 may sometimes be utilized in conjunction with the clock signal LVL_CLK 151 selected by leveling multiplexer 150 for finer control of the phase of LVL_CLK 151.

Specifically, as the amount of delay provided by delay chain 281 approaches 45 degrees, it is preferable to have leveling multiplexer 150 of FIG. 1 select a clock signal LVL_CLK 151 such that it has a phase that is 45 degrees greater than the phase of LVL_CLK 151 currently selected by leveling multiplexer 150 of FIG. 1 and simultaneously set the delay provided by delay chain 281 to 0 degrees. Additionally, as the amount of delay provided by delay chain 281 approaches 0 degrees, it is preferable to have leveling multiplexer 150 of FIG. 1 select a clock signal LVL_CLK 151 such that it has a phase that is 45 degrees less than the phase of LVL_CLK 151 currently selected by leveling multiplexer 150 of FIG. 1 and simultaneously set the delay provided by delay chain 281 to the amount of delay specified by delay control signal 251.

Delay chain tracking circuit 130 is operable to track the operation of delay chain 281 in the manner described above after sampling circuit 120 has properly calibrated delay chain 281. Specifically, delay chain tracking circuit 130 is designed to track the delay provided by delay chain 281 with respect to the phase of the clock signal LVL_CLK 151 selected by leveling multiplexer 150. When the amount of delay provided by delay chain 281 approaches 45 degrees, the phase of the clock signal LVL_CLK 151 selected by leveling multiplexer 150 is incremented by 45 degrees and the delay provided by delay chain 281 is simultaneously set to 0 degrees. On the other hand, when the amount of delay provided by delay chain 281 approaches 0 degrees and needs to be further reduced, the phase of the clock signal LVL_CLK 151 selected by leveling multiplexer 150 is decremented by 45 degrees and the delay provided by delay chain 281 is simultaneously set to amount of delay specified by delay control signal 251.

Delay chain tracking circuit 130 is composed of two parts. The first part of delay chain tracking circuit 130 is operable make a decision as to when to increment the phase of the clock signal LVL_CLK 151, selected by leveling multiplexer 150, by 45 degrees. The second part of delay chain tracking circuit 130 is operable to provide a delay setting that is one delay step less than the phase difference between PLVL_CLK 152 and LVL_CLK 151. In an embodiment, one delay step is substantially similar to the shortest amount by which a delay chain is operable to delay its input signal. In an embodiment, a delay chain may be programmable to delay its input signal by 12.5, 25, or 37.5 picoseconds. For example, when delay chain 281 has been programmed to delay its input signal by 12.5 picoseconds, one delay step is 12.5 picoseconds.

The first part of delay chain tracking circuit 130 includes multiplexer 230, NAND gate 246, delay chain 239, phase detector 240, registers 234, 235, and 236, and AND gate 247. The first part of delay chain tracking circuit 130 receives input signal SMPL_CLK 123 from sampling circuit 120 and input NLVL_CLK 153 from leveling multiplexer 150 and outputs signal ALIGN 131 to assistant logic controller 140 of FIG. 1. The phases of signals SMPL_CLK 123 and NLVL_CLK 153 are compared by examining their respective rising edges (or falling edges). Signal ALIGN 131 is logic high when it is determined that the rising edge (or falling edge) of SMPL_CLK 123 occurs behind of the rising edge (or falling edge) of NLVL_CLK 153. If signal ALIGN 131 is logic high, then leveling multiplexer 150 of FIG. 1 may select a clock signal LVL_CLK 151 such that it has a phase that is 45 degrees greater than the phase of LVL_CLK 151 currently selected by leveling multiplexer 150 of FIG. 1 and the delay provided by delay chain 281 may be simultaneously set to 0 degrees. The operation of the first part of delay chain tracking circuit 130 is described in greater detail below.

Multiplexer 230 is operable to select one of input signals VCC or VSS based on control signal NLVL_CLK 152. When NLVL_CLK 152 is logic high, multiplexer 230 selects VCC and when NLVL_CLK 152 is logic low, multiplexer 230 selects VSS. The output of multiplexer 230 is transmitted to NAND gate 246 as a first input. NAND gate 246 receives signal VCC as its second input. NAND gate 246 performs a logical NAND operation on its two input signals and transmits the resulting signal to delay chain 239. Delay chain 239 may or may not delay this resulting signal.

The output of delay chain 239 is transmitted to phase detector 240 as a first input. Phase detector 240 receives signal SMPL_CLK 123 as a second input. The operation of phase detector 240 is substantially similar to that of phase detector 263 described earlier in connection with sampling circuit 120. In particular, phase detector 240 is operable to compare the phase of input signals SMPL_CLK 123 and the output of delay chain 239. However, in contrast to phase detector 263, phase detector 240 outputs only signal SMPLO2 229. Output signal SMPLO2 229 indicates the result of the phase comparison. The values assigned to signal SMPLO2 229 based on the relative phases of SMPL_CLK 123 and the output of delay chain 239 are identical to the values assigned to signal SMPLO2 269 as described in TABLE 1. In particular, SMPLO2 229 is logic high only when the rising edge (or falling edge) of the output of delay chain 239 is aligned or ahead of the rising edge (or falling edge) of SMPL_CLK 123.

SMPLO2 229 is transmitted to register 234. The output of register 234 is input to register 235 and the output of register 235 is input to register 236. The outputs of each of register 234, 235, and 236 are also input to AND gate 247 which is operable to perform a logical AND operation on the three input signals it receives and output signal ALIGN 131. Thus, signal ALIGN 131 will be logic high only if each of the outputs of registers 234, 235, and 236 is logic high, i.e., signal SMPLO2 229 may be logic high for at least 3 consecutive clock cycles in order for the signal ALIGN 131 to be logic high. Signal ALIGN 131 is transmitted to assistant logic controller 140 of FIG. 1 which then transmits the appropriate delay chain control signal 142 to gating circuit 110 and sampling circuit 120 and the appropriate control signal to leveling multiplexer 150 of FIG. 1. Therefore, delay chains 281 and 262 set the amount by which they delay their respective input signals to 0 degrees and leveling multiplexer 150 of FIG. 1 updates its selection of signals LVL_CLK 151, NLVL_CLK 152, and PLVL_VLK 153 such that the respective phase of each of the three signals is 45 degrees greater than the phase each signal previously had.

The second part of delay chain tracking circuit 130 includes delay chains 241 and 242, phase detector 243, NAND gates 225 and 226, inverters 223 and 224, registers 231, 232, and 233, noise filter 237, counter 238, and AND gates 227 and 248. The second part of delay chain tracking circuit 130 receives inputs LVL_CLK 151 and PLVL_CLK 152 from leveling multiplexer 150 of FIG. 1 and outputs signal VALID 132 to assistant logic controller 140 of FIG. 1. The second part of delay chain tracking circuit 130 may also output delay control signal 151 to assistant logic controller 140 of FIG. 1 (not shown). The phases of signals LVL_CLK 151 and PLVL_CLK 152 are compared by examining their respective rising or falling edges. If it is determined that the rising edge (or falling edge) of LVL_CLK 151 occurs ahead of the rising edge (or falling edge) of PLVL_CLK 152, then counter 238 may reduce the delay of delay chain 241. If it is determined that the rising edge (or falling edge) of LVL_CLK 151 occurs behind of the rising edge (or falling edge) of PLVL_CLK 152, then counter 238 may increase the delay of delay chain 241. If it is determined that the rising edge (or falling edge) of LVL_CLK 151 aligns with the rising edge (or falling edge) of PLVL_CLK 152, then the delay of delay chain 241 may not be changed and the signal VALID 132 becomes logic high. If signal VALID 132 is logic high then delay control signal 251 is valid to be used. When the amount by which delay chain 281 delays its input signal approaches 0 degrees and needs to be reduced further, leveling multiplexer 150 of FIG. 1 may select a clock signal LVL_CLK 151 such that it has a phase that is 45 degrees less than the phase of LVL_CLK 151 currently selected by leveling multiplexer 150 of FIG. 1 and the delay provided by delay chain 281 is simultaneously set to the value provided by delay control signal 251. The operation of the second part of delay chain tracking circuit 130 is described in greater detail below.

Delay chains 241 and 242 receive input signals PLVL_CLK 152 and LVL_CLK 151, respectively. Delay chain 241 is operable to delay signal PLVL_CLK 152 by an amount indicated by delay control signal 251, received from counter 238, and to transmit the delayed signal PLVL_CLK 152 to phase detector 243 as a first input. Counter 238 selects the amount by which delay control signal 251 instructs delay chain 241 to delay its input signal PLVL_CLK 152 such that PLVL_CLK 152 plus the amount by which delay chain 281 delays its input signal is aligned with LVL_CLK 151. Delay chain 242 may be set up to not delay signal LVL_CLK 151 and may transmit the signal LVL_CLK 151 to phase detector 243 as a second input.

Phase detector 243 operates in a substantially similar manner as phase detector 263 described earlier in connection with sampling circuit 120 and similarly generates signals SMPLO2 244 and SMPLO1 245. Signals SMPLO2 244 and SMPLO1 245 are analogous respectively to signals SMPLO2 269 and SMPLO1 270 of sampling circuit 120 described earlier. Inverter 223 and NAND gates 225 and 226 are substantially similar to inverter 264 and NAND gates 265 and 266, respectively, of sampling circuit 120 and are operable to generate signals DUPDWNEN 221 and DUPNDWN 220 from signals SMPLO2 244 and SMPLO1 245. Signals DUPDWNEN 221 and DUPNDWN 220 are analogous respectively to signals UPDWNEN 273 and UPNDWN 272 of sampling circuit 120 described earlier. As described earlier, TABLE 1 indicates the values of UPDWNEN 273 and UPNDWN 272 given the values of signals SMPLO2 269 and SMPLO1 270. Because signals SMPLO2 244 and SMPLO1 245 are analogous respectively to signals SMPLO2 269 and SMPLO1 270 of sampling circuit 120, and signals DUPDWNEN 221 and DUPNDWN 220 are generated from signals SMPLO2 244 and SMPLO1 245 in the same manner that signals UPDWNEN 273 and UPNDWN 272 of sampling circuit 120 are generated from signals SMPLO2 269 and SMPLO1 270 of sampling circuit 120, TABLE 1 also provides the values of signals DUPDWNEN 221 and DUPNDWN 220 given the values of SMPLO2 244 and SMPLO1 245.

Signals DUPDWNEN 221 and DUPNDWN 220 are input to noise filter 237. Noise filter 237 is substantially similar in operation to noise filter 267 of sampling circuit 120. Accordingly, noise filter 237 is operable to generate two output signals which depend on SMPLO2 244 and SMPLO1 245 in the same manner as UPDWNENO 121 and UPNDWNO 122, as shown in TABLE 1. Noise filter 237 transmits these output signals to counter 238, which generates delay control signal 251. Referring to TABLE 1, if signals DUPDWNEN 221 and DUPNDWN 220 are both logic high, then counter 238 generates delay control signal 251 such that delay chain 241 is instructed to increase the amount by which it delays the signal input to it. If signal DUPDWNEN 221 is logic high and signal DUPNDWN 220 is logic low, then counter 238 generates delay control signal 251 such that delay chain 241 is instructed to decrease the amount by which it delays the signal input to it.

SMPLO1 245 is inverted by inverter 224 and transmitted to AND gate 227 as a first input. Therefore, when SMPLO1 245 is logic low, the output of inverter 224 is logic high. SMPLO2 244 is transmitted to AND gate 227 as a second input. AND gate 227 is operable to perform a logical AND operation on its two input signals and to transmit the result to register 231. Thus, the output of AND gate 227 is logic high only when SMPLO2 244 is logic high and SMPLO1 245 is logic low, i.e., when PLVL_CLK 152 and LVL_CLK 151 are aligned in phase. The output of register 231 is input to register 232 and the output of register 232 is input to register 233. The outputs of each of register 231, 232, and 233 are also input to AND gate 248 which is operable to perform a logical AND operation on the three input signals it receives and output signal VALID 132. Thus, signal VALID 132 will be logic high if each of the outputs of registers 231, 232, and 233 is logic high, i.e., signal SMPLO2 244 may be logic high and SMPLO1 245 may be logic low for at least 3 consecutive clock cycles in order to result in a signal VALID 132 that is logic high. Signal VALID 132 is transmitted to assistant logic controller 140 of FIG. 1 which then transmits the appropriate delay chain control signal 142 to gating circuit 110 and sampling circuit 120 and the appropriate control signal (e.g., delay control signal 251) to leveling multiplexer 150 of FIG. 1, as explained above.

The system described in FIG. 2 can thus calibrate a DQS enable/disable signal and track the timing of the DQS enable/disable signal with respect to changes in VT. In an embodiment, the system includes a gating circuit 110, a sampling circuit 120, and a delay chain tracking circuit 130. Gating circuit 110 receives a DQS enable signal DQS_EN 111 and an input DQS signal DQS_IN 112. Gating circuit 110 may be operative to calibrate signal DQS_EN 111 based on an amount of delay. Gating circuit 110 may further be operative to output a calibrated DQS signal DQS_OUT 113. Sampling circuit 120 may be operative to sample the input DQS signal using SMPL_CLK 123 and provide information to gating circuit 110 regarding adjustment of the delay amount on the DQS enable/disable path (i.e., the amount by which delay chain 281 should delay its input signal) based on the sampling results. Delay chain tracking circuit 130 may be coupled to gating circuit 110 and sampling circuit 120. Delay chain tracking circuit 130 may be operative to provide information regarding the number of delay steps equivalent to one leveling phase based on SMPL_CLK 123 and a leveling clock signal.

Figure 3:
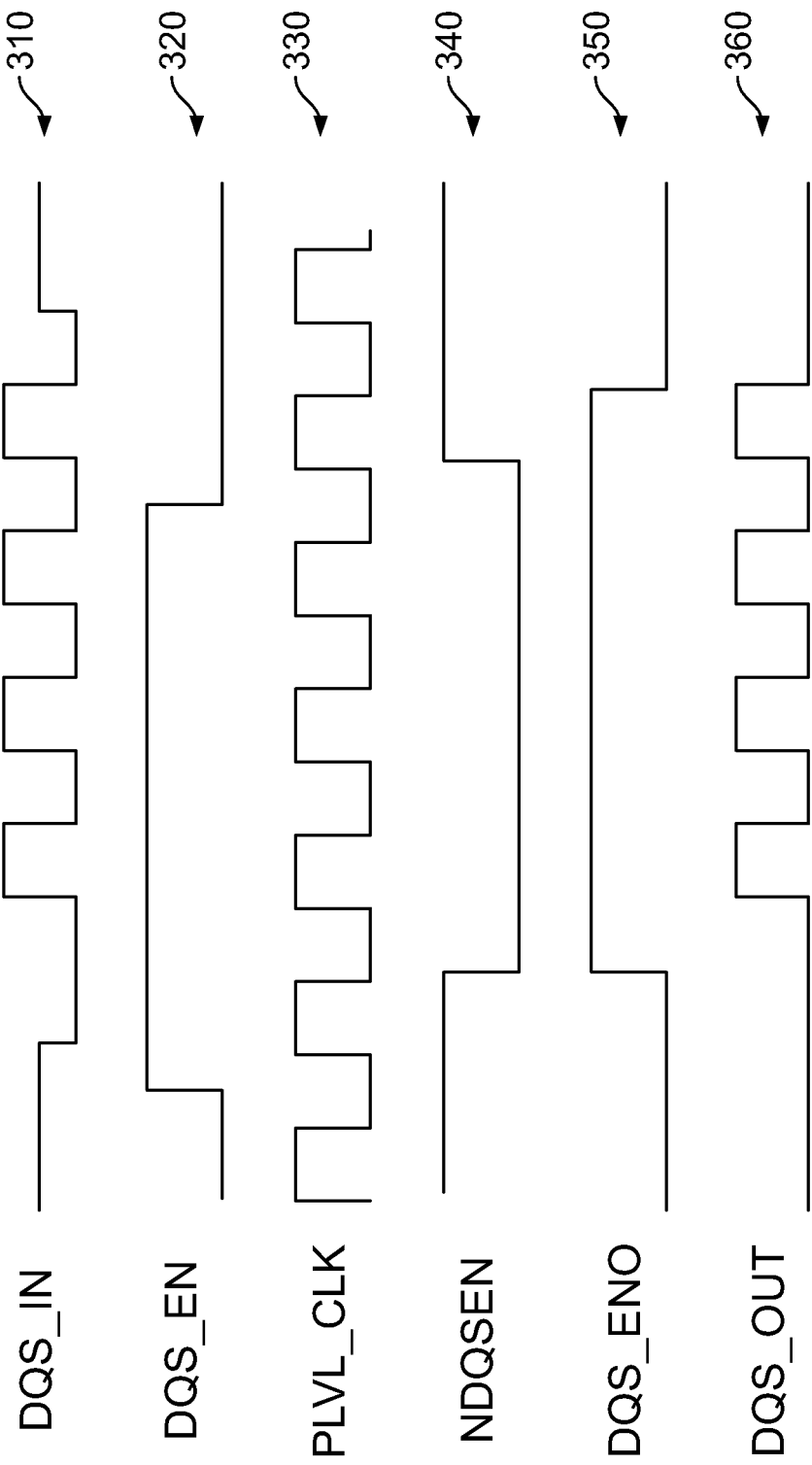
FIG. 3 is an illustrative timing diagram illustrating a few of the signals discussed herein.

FIG. 3 is an illustrative timing diagram illustrating a few of the signals discussed herein. FIG. 3 shows examples of the signals and is not drawn to scale. Waveform 310 is an example of signal DQS_IN 112. Waveform 320 is an example of signal DQS_EN 111. Waveform 330 is an example of signal LVL_CLK 151. Waveform 340 is an example of signal NDQSEN 284. Waveform 350 is an example of signal DQS_ENO 289. Waveform 360 is an example of signal DQS_OUT 113.

Waveform 310 illustrates that DQS_IN 112 is initially in a high-impedance state, transitions to a logic low signal value state (previously defined to be the preamble), begins toggling between a logic high signal value state and a logic low signal value state, and then reverts back to a high-impedance state. The period of time after the last falling edge of DQS_IN 112 and before DQS_IN 112 reverts to a high-impedance state may be identified as the postamble.

Waveform 340 illustrates the relationship between DQS_EN 111 and NDQSEN 284. In particular, the rising edge of DQS_EN 111 corresponds to the falling edge of NDQSEN 284. Moreover, the falling edge of NDQSEN 284 trails the rising edge of DQS_EN 111, as described earlier. This is a result of the fact that DQS_EN 111 is operated on by the half-conversion circuit.

Waveform 350 illustrates the relationship between NDQSEN 284 and DQS_ENO 289. In particular, when NDQSEN 284 changes to logic low, postamble register 282 of FIG. 2 is cleared and NDQSEN 284 is immediately passed through to the output of postamble register 282 of FIG. 2, i.e., the output of postamble register 282 of FIG. 2 is also logic low. The output of postamble register 282 of FIG. 2 is inverted by inverter 290 of FIG. 2 to generate DQS_ENO 289, which will be logic high. Therefore, DQS_ENO 289 changes to logic high as soon as NDQSEN 284 changes to logic low.

In contrast, when NDQSEN 284 changes to logic high, DQS_ENO 289 changes to logic low after some delay. This is because when NDQSEN 284 changes to logic high, postamble register 282 of FIG. 2 waits for the falling edge of DQS_IN 112 before outputting a logic high signal to inverter 290. The output of inverter 290 of FIG. 2, DQS_ENO 289, therefore changes to logic low after the falling edge of DQS_IN 112.

Waveform 360 is an example of an appropriately calibrated DQS signal DQS_OUT 113.

Figure 4:
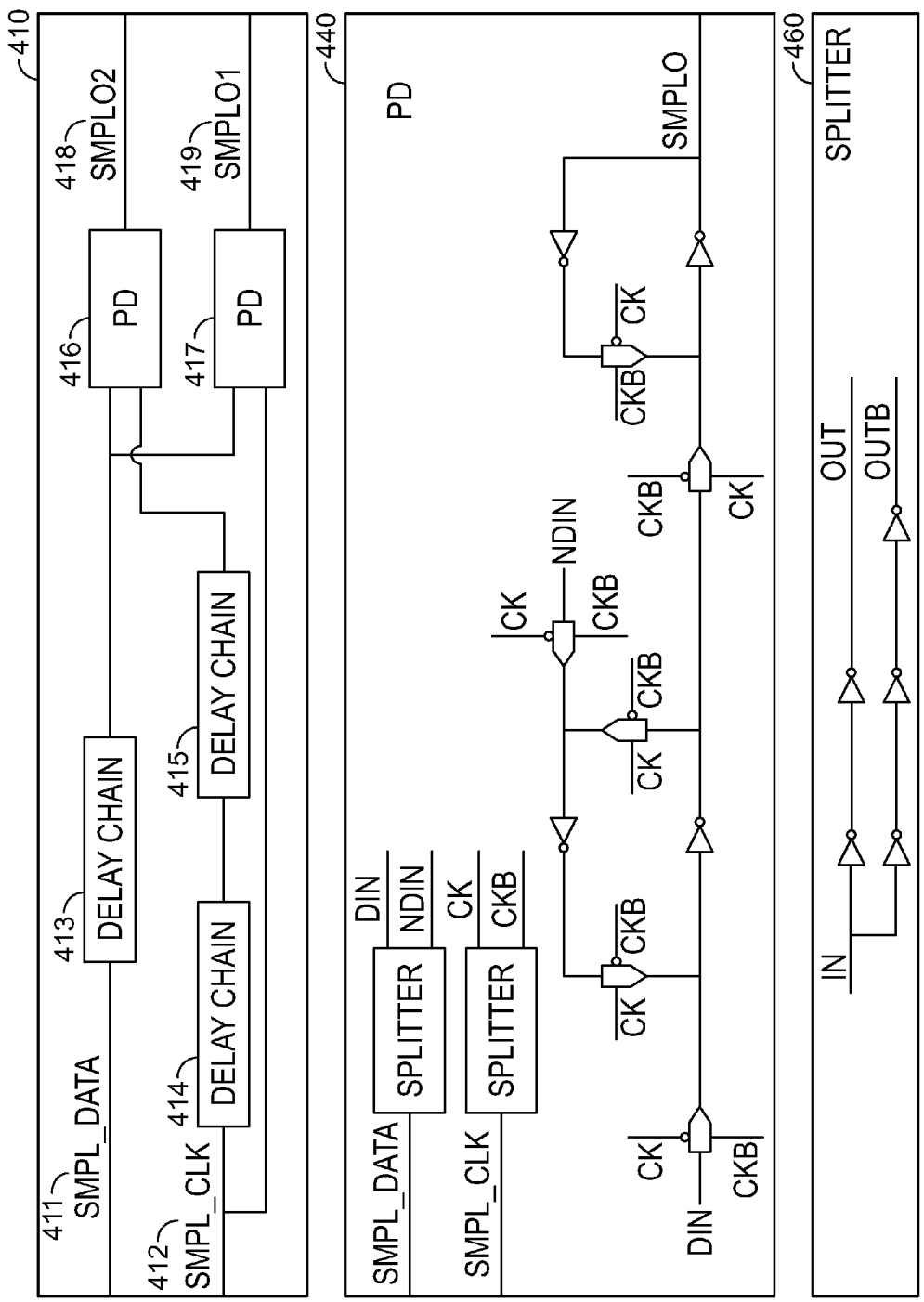
FIG. 4 is a more detailed, but still simplified block diagram of the components of a phase detector, according to an illustrative embodiment.

FIG. 4 is a more detailed, but still simplified block diagram of the components of phase detector 263 of FIG. 2, according to an illustrative embodiment. Phase detectors 240 and 243 of FIG. 2 are substantially similar to phase detector 263 of FIG. 2. Block 410 shows phase detector 263 in greater detail according to one embodiment. Block 410 specifically depicts a two-phase detector, although in other embodiments, other types of phase detectors may be used. Block 410 receives two input signals, SMPL_DATA 411 and SMPL_CLK 412, whose phases may be compared. Block 410 includes delay chains 413, 414, and 415, each of which is operable to delay its respective input signal by a programmable amount ΔT. Although delay amount ΔT is programmable, it is identical for each of delay chains 413, 414, and 415. In an embodiment, delay amount ΔT may be one of 12.5, 25, or 37.5 picoseconds. Block 410 also includes differential phase detectors 416 and 417.

Input SMPL_DATA 411 is delayed by an amount ΔT by delay chain 413. The delayed signal SMPL_DATA 411 is transmitted by delay chain 413 to differential phase detector 416 and to differential phase detector 417. Input SMPL_CLK 412 is delayed by delay amount 2*ΔT by feeding it first through delay chain 414 and then through delay chain 415. The output of delay chain 415 is transmitted to differential phase detector 416. Input SMPL_CLK 412 is also provided to differential phase detector 417. Each of differential phase detectors 416 and 417 is operable to compare the phase of its two input signals by comparing the timing of the respective rising edges (or falling edges) of its two input signals. Specifically, differential phase detector 416 outputs signal SMPLO2 418 that is logic low if the rising edge (or falling edge) of its input received from delay chain 415 is ahead of the rising edge (or falling edge) of its input received from delay chain 413. Differential phase detector 416 outputs signal SMPLO2 418 that is logic high if the rising edge (or falling edge) of its input received from delay chain 415 is behind the rising edge (or falling edge) of its input received from delay chain 413. Similarly, differential phase detector 417 outputs signal SMPLO1 419 that is logic low if the rising edge (or falling edge) of its input SMPL_CLK 412 is ahead of the rising edge (or falling edge) of its input received from delay chain 413 and outputs signal SMPLO1 419 that is logic high if the rising edge (or falling edge) of its input SMPL_CLK 412 is behind the rising edge (or falling edge) of its input received from delay chain 413.

Block 440 is an illustrative example of differential phase detectors 416 and 417. SMPL_DATA 411 and SMPL_CLK 412 each go through a signal splitter. Block 460 depicts a splitter in greater detail. The first splitter receives SMPL_DATA 411 as input and outputs a first signal DIN, which is a delayed version of SMPL_DATA 411, and a second signal NDIN, which is a delayed version of inverted SMPL_DATA 411. The second splitter receives SMPL_CLK 412 as input and outputs a first signal CK, which is a delayed version of SMPL_CLK 412, and a second signal CKB, which is a delayed version of inverted SMPL_CLK 412. The signals DIN, NDIN, CK, and CKB are then used in the manned depicted by block 440 to generate output signal SMPLO. Compared to a conventional flip flop, the complimentary signals DIN and NDIN drive a first latch together to reduce the TSU (data set up) and THD (data hold) time of the flip flop by half. This helps to increase the accuracy of the differential phase detector.

Figure 5:
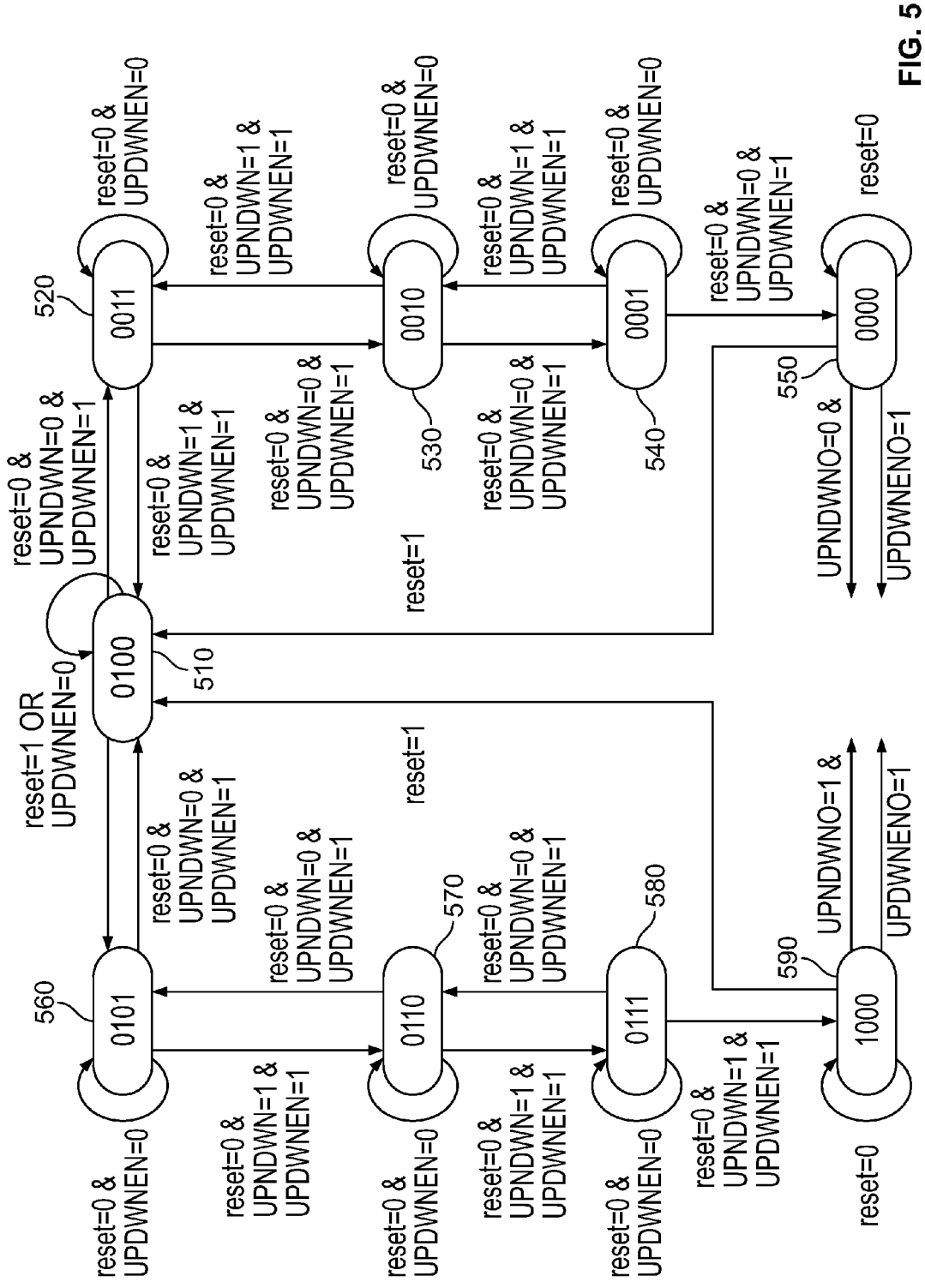
FIG. 5 is a simplified state diagram of a noise filter, according to an illustrative embodiment.

FIG. 5 is a simplified state diagram of a noise filter, according to an illustrative embodiment. Noise filters 237 and 267 of FIG. 2 are substantially similar and operate in a manner that is substantially similar to what is shown in FIG. 5 in order to filter out high frequency noise from their respective input signals. Noise filter 267 of FIG. 2 is initially in state 510. It remains in state 510 if reset signal DQS_EN_RST 271 is logic high or if signal UPDWNEN 273 is logic low. Additionally, the state of noise filter 267 is reset to state 510 whenever reset signal DQS_EN_RST 271 is logic high. The state of noise filter 267 changes from initial state 510 only when reset signal DQS_EN_RST 271 is logic low and signal UPDWNEN 273 is logic high, as described below.

When signal UPDWNEN 273 is logic high and signal UPNDWN 272 is logic low, according to TABLE 1, delay chain 281 of FIG. 2 may be instructed to decrease the amount by which it delays its input signal. However, in order to remove high frequency noise from signals UPDWNEN 273 and UPNDWN 272, noise filter 267 of FIG. 2 does not output signals UPDWNENO 122 and UPNDWNO 121 immediately. Instead, the state of noise filter 267 of FIG. 2 is changed to state 520. If in the next clock cycle signal UPDWNEN 273 remains logic high and signal UPNDWN 272 remains logic low, then the state of noise filter 267 of FIG. 2 is changed to state 530. Similarly, if signal UPDWNEN 273 remains logic high and signal UPNDWN 272 remains logic low in the following two clock cycles, then the state of noise filter 267 of FIG. 2 is first changed to state 540 and then to state 550. When the state of noise filter 267 reaches state 550 output signals UPDWNENO 122 and UPNDWNO 121 may be generated such that UPDWNENO 122 is logic high and UPNDWNO 121 is logic low.

If noise filter 267 of FIG. 2 is in any of states 520, 530, 540, or 550 and reset signal DQS_EN_RST becomes logic low or signal UPDWNEN 273 is logic low (indicating that the two input signals of phase detector 263 are aligned), then the state of noise filter 267 of FIG. 2 may remain unchanged. Furthermore, if noise filter 267 of FIG. 2 is in any of states 520, 530, or 540 and signal UPDWNEN 273 is logic high and signal UPNDWN 272 is also logic high (indicating, according to TABLE 1, that delay chain 281 of FIG. 2 may be instructed to increase the amount by which it delays its input signal), then the state of noise filter 267 may be changed to a previous state. For example, if noise filter 267 is in state 530 and signals UPDWNEN 273 and UPNDWN 272 are logic high, then the state of noise filter 267 may be changed to state 520.

When noise filter 267 of FIG. 2 is in state 510 and signal UPDWNEN 273 is logic high and signal UPNDWN 272 is logic high, according to TABLE 1, delay chain 281 of FIG. 2 may be instructed to decrease the amount by which it delays its input signal. However, as discussed above, in order to remove high frequency noise from signals UPDWNEN 273 and UPNDWN 272, noise filter 267 of FIG. 2 does not output signals UPDWNENO 122 and UPNDWNO 121 immediately. Instead, the state of noise filter 267 of FIG. 2 may be changed to state 560. If in the next clock cycle signals UPDWNEN 273 and UPNDWN 272 remain logic high, then the state of noise filter 267 of FIG. 2 may be changed to state 570. Similarly, if signals UPDWNEN 273 and UPNDWN 272 remain logic high in the following two clock cycles, then the state of noise filter 267 of FIG. 2 may be first changed to state 580 and then to state 590. When the state of noise filter 267 of FIG. 2 reaches state 590 output signals UPDWNENO 122 and UPNDWNO 121 may be generated so that UPDWNENO 122 is logic high and UPNDWNO 121 is logic high.

If noise filter 267 of FIG. 2 is in any of states 560, 570, 580, or 590 and reset signal DQS_EN_RST becomes logic low or signal UPDWNEN 273 is logic low (indicating that the two input signals of phase detector 263 of FIG. 2 are aligned), then the state of noise filter 267 of FIG. 2 may remain unchanged. Furthermore, if noise filter 267 of FIG. 2 is in any of states 560, 570, or 580 and signal UPDWNEN 273 is logic high and signal UPNDWN 272 is logic low (indicating, according to TABLE 1, that delay chain 281 may be instructed to decrease the amount by which it delays its input signal), then the state of noise filter 267 of FIG. 2 may be changed to a previous state. For example, if noise filter 267 of FIG. 2 is in state 570 and UPDWNEN 273 is logic high and signal UPNDWN 272 is logic low, then the state of noise filter 267 may be changed to state 560.

Figure 6:
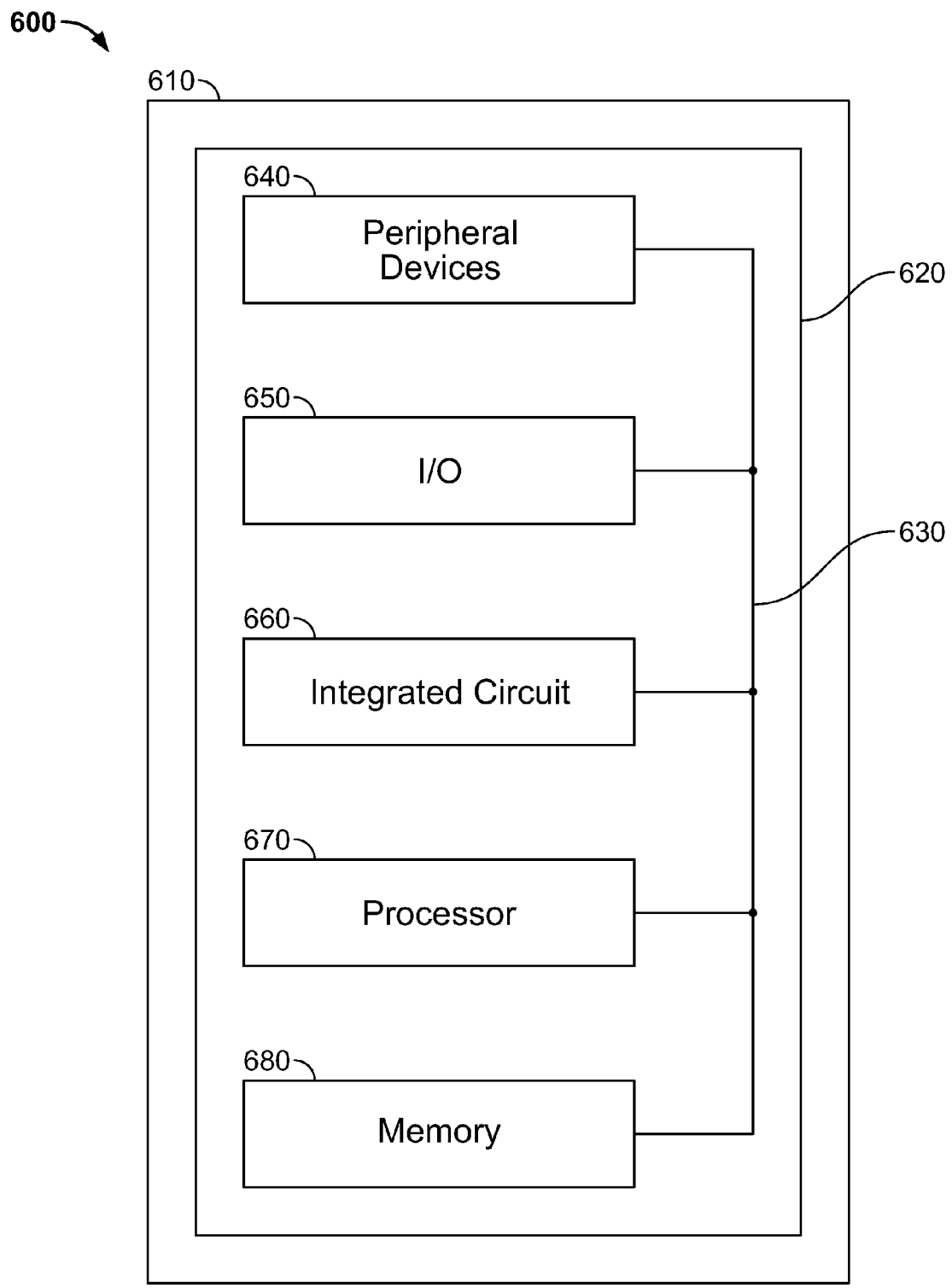
FIG. 6 illustrates a circuit or other device (e.g., application specific standard product (ASSP), application specific integrated circuit (ASIC), programmable logic device (PLD), full-custom chip, dedicated chip) which includes embodiments of the DQS enable/disable calibration and tracking circuits described herein as being within a data processing system.

FIG. 6 illustrates a circuit or other device (e.g., integrated circuit, application specific standard product (ASSP), application specific integrated circuit (ASIC), programmable logic device (PLD), full-custom chip, dedicated chip) which includes embodiments of the DQS enable/disable calibration and tracking circuits described herein as being within a data processing system 600. In an embodiment, circuit 660 may be substantially similar to circuit 100. Data processing system 600 can include one or more of the following components: a processor 670, memory 680, I/O circuitry 650, and peripheral devices 640. These components are connected together by a system bus or other interconnections 630 and are populated on a circuit board 620 which is contained in an end-user system 610.

System 600 could be used in a wide variety of applications, such as computer networking, data networking, instrumentation, video processing, digital signal processing, or any other application where the advantage of using programmable or reprogrammable logic is desirable. Circuit 660 can be used to perform a variety of different logic functions. For example, circuit 660 can be configured as a processor or controller that works in cooperation with processor 670. Circuit 660 may also be used as an arbiter for arbitrating access to a shared resource in system 600. In yet another example, circuit 660 can be configured as an interface between processor 670 and one of the other components in system 600. It should be noted that system 600 is only exemplary, and that the true scope and spirit of the invention should be indicated by the following claims.

Although components in the above disclosure are described as being connected with one another, they may instead be connected to one another, possibly via other components in between them. It will be understood that the foregoing are only illustrative of the principles of the invention, and that various modifications can be made by those skilled in the art without departing from the scope and spirit of the invention. One skilled in the art will appreciate that the present invention can be practiced by other than the described embodiments, which are presented for purposes of illustration and not of limitation, and the present invention is limited only by the claims that follow.

What is claimed is:

1. A system for calibrating timing of a signal, the system comprising:

a first circuit for generating a calibrated signal by calibrating the signal based on a first clock; and a second circuit for maintaining the timing of the calibrated signal over a plurality of clock cycles based on the first clock and a second clock.

2. The system of claim 1, wherein the first circuit further calibrates the timing of the signal such that a falling edge of the calibrated signal is aligned with a rising edge of an input DQS signal.

3. The system of claim 1, wherein the first circuit further calibrates the timing of the signal based on an amount of delay received from a sampling circuit, wherein the amount of delay is provided by the sampling circuit based on the first clock.

4. The system of claim 1, wherein the second circuit further maintains the timing of the calibrated signal by tracking a phase of the second clock over the plurality of clock cycles and correcting the phase of the second clock.

5. The system of claim 4, wherein the second circuit comprises:

a first tracking circuit for generating a first indicator signal, wherein the first indicator signal indicates that a phase of the second clock needs to be increased and an amount of delay set to zero; and a second tracking circuit for generating a second indicator signal and a control signal, wherein the second indicator signal indicates that the control signal is ready to be used.

6. The system of claim 5, wherein the first tracking circuit comprises:

a delay chain for generating an input signal for a phase detector, wherein the phase detector processes the first clock and the second clock and outputs a third indicator signal; and a plurality of registers for checking a phase of the third indicator signal over the plurality of clock cycles, wherein an output of each of the plurality of registers is used to generate the first indicator signal.

7. The system of claim 6, wherein the phase detector comprises a plurality of delay chains, and wherein each delay chain in the plurality of delay chains has a programmable delay.

8. The system of claim 5, wherein the second tracking circuit comprises:

a phase detector for processing the second clock and outputting a third indicator signal; and a plurality of registers for checking a phase of the third indicator signal over the plurality of clock cycles, wherein an output of each of the plurality of registers is used to generate the second indicator signal.

9. The system of claim 3, further comprising a leveling multiplexer circuit coupled to the first circuit, the sampling circuit, and the second circuit, wherein the leveling multiplexer circuit provides three clock signals, each of the three clock signals having a common frequency and a different phase.

10. A method for calibrating timing, the method comprising:

calibrating, using a first circuit, a signal based on a first clock; and maintaining, using a second circuit, the timing of the calibrated signal over a plurality of clock cycles based on the first clock and a second clock.

11. The method of claim 10, wherein the calibrating comprises calibrating the timing of the signal such that a falling edge of the calibrated signal is aligned with a rising edge of an input DQS signal.

12. The method of claim 10, wherein the calibrating is based on an amount of delay received from a sampling circuit, wherein the amount of delay is provided by the sampling circuit based on the first clock.

13. The method of claim 10, wherein the maintaining comprises tracking a phase of the second clock over the plurality of clock cycles and correcting the phase of the second clock.

14. The method of claim 13, wherein the maintaining further comprises:

generating a first indicator signal, using a first tracking circuit, wherein the first indicator signal indicates that a phase of the second clock needs to be increased and an amount of delay set to zero; and generating a second indicator signal and a control signal, using a second tracking circuit, wherein the second indicator signal indicates that the control signal is ready to be used.

15. The method of claim 14, wherein the first tracking circuit is further configured for:

generating an input signal for a phase detector using a delay chain;

processing the first clock and the second clock and outputting a third indicator signal using the phase detector; and checking a phase of the third indicator signal over the plurality of clock cycles using a plurality of registers, wherein an output of each of the plurality of registers is used to generate the first indicator signal.

16. The method of claim 15, wherein the phase detector comprises a plurality of delay chains, and wherein each delay chain in the plurality of delay chains has a programmable delay.

17. The method of claim 14, wherein the second tracking circuit is further configured for:

processing the second clock and outputting a third indicator signal using a phase detector; and checking a phase of the third indicator signal over the plurality of clock cycles using a plurality of registers, wherein an output of each of the plurality of registers is used to generate the second indicator signal.

18. The method of claim 12, further comprising:

providing, using a leveling multiplexer circuit, three clock signals, wherein:

each respective clock signal has a common frequency and a different phase, and the leveling multiplexer circuit is coupled to the first circuit, the sampling circuit, and the second circuit.

19. A system for calibrating timing, the system comprising:

a first circuit for providing an amount of delay based on a first clock, wherein the first circuit comprises:

a delay chain for receiving a delay control signal;

a second circuit for:

receiving an input signal; and calibrating the input signal based on the amount of delay to generate a calibrated signal; and a third circuit, coupled to the first circuit and the second circuit, for maintaining the timing of the calibrated signal over a plurality of clock cycles.

\* \* \* \* \*